United States Patent [19]
Graff

[11] 3,926,837
[45] Dec. 16, 1975

[54] METHOD FOR THE PREPARATION OF EUROPIUM ACTIVATED YTTRIUM OXYSULFIDE

[75] Inventor: Eugene A. Graff, Cedar Grove, N.J.

[73] Assignee: Westinghouse Electric Corporation, Pittsburgh, Pa.

[22] Filed: Oct. 29, 1974

[21] Appl. No.: 518,914

[52] U.S. Cl. .......................................... 252/301.4 S
[51] Int. Cl.² ................... C09K 11/14; C09K 11/46
[58] Field of Search .............................. 252/301.4 S

[56] References Cited
UNITED STATES PATENTS

| | | | |
|---|---|---|---|
| 3,502,590 | 3/1970 | Royce et al. | 252/301.4 S |
| 3,515,675 | 6/1970 | Byler et al. | 252/301.4 S |
| 3,562,174 | 2/1971 | Schuil | 252/301.4 S |
| 3,647,707 | 3/1972 | Gillooly et al. | 252/301.4 S |

*Primary Examiner*—Jack Copper
*Attorney, Agent, or Firm*—W. D. Palmer

[57] ABSTRACT

A method of preparing a europium activated yttrium oxysulfide phosphor using a raw mix containing all phosphor constituents in solid form and using a single firing in double covered trays. The method makes possible economically large batches not practical for processes which use the introduction of gaseous sulfur compounds and eliminates the necessity for double firing which is generally required when the sulfur is introduced in solid form. In the method of the instant invention, the sulfur is introduced in solid form as sodium thiosulfate and it is present in an amount at least five times the amount stoichiometric for the yttrium oxysulfide phosphor.

3 Claims, No Drawings

METHOD FOR THE PREPARATION OF EUROPIUM ACTIVATED YTTRIUM OXYSULFIDE

BACKGROUND OF THE INVENTION

This invention relates to cathode ray phosphors and specifically relates to the preparation of europium activated yttrium oxysulfide.

Prior methods of making this phosphor include firing a mixture of yttrium and europium oxides along with elemental sulfur gas or gaseous sulfides. Such methods are limited to quite small batch sizes due to the difficulty of obtaining proper gas access to the interior of larger batches.

An alternate prior art method for preparing this phosphor includes the use of compounds which yield alkali metal sulfides and polysulfides upon heating. U.S. Pat. No. 3,502,590, issued to Royce on Mar. 24, 1970, teaches the use of a sodium thiosulfate in slight excess (three times stoichiometric, for example) and firing in a nearly closed vessel. While this method is superior for factory processing as compared to the method employing gaseous sulfides, this method generally produces a mixture of yttrium oxysulfide along with yttrium oxide and yttrium sulfide. U.S. Pat. No. 3,647,707, issued to Gillooly and Rabatin on March 7, 1972, notes this problem and teaches a second firing using either sodium or potassium sulfides to recrystallize the mixture into yttrium oxysulfide, and thereby eliminating the yttrium oxide and yttrium sulfide phases.

SUMMARY OF THE INVENTION

It has been discovered that by employing the proper starting compounds in the proper quantities and with the proper firing container, single phase yttrium oxysulfide phosphor can be produced using a single blending step with a single firing. Employing this process eliminates the need to premix the yttrium oxide and europium oxide or to prefire these or any ingredients to obtain a superior phosphor.

A raw mix is prepared containing yttrium oxide and europium oxide in amounts stoichiometric to produce yttrium oxysulfide phosphor. The raw mix also contains sodium thiosulfate in an amount at least five times the amount stoichiometric for the yttrium oxysulfide phosphor. A single firing of the raw mix is used, this firing being at a temperature of about 900°–1300°C. The firing is performed in double covered trays. Preferably the phosphor is washed after firing to remove residual sodium compounds.

DESCRIPTION OF THE PREFERRED EMBODIMENT

The invention is carried out by blending yttrium oxide and europium oxide along with the appropriate quantity of sodium thiosulfate. The mixture is then fired in covered alundum trays placed inside of a second set of trays. The use of the double covered trays is critical. Experiments in which X-ray analysis has been used to examine the phosphor for yttrium oxide have shown that the yttrium oxide phase is present in excessive amounts (25 to 40% of the fired material being yttrium oxide) when fired in a nearly closed vessel even when relatively large amounts (10 times stoichiometric) of sodium thiosulfate is used. Even the use of relatively well-closed vessels (a single inverted tray cover) together with a relatively large amount of sodium thiosulfate (10 times stoichiometric) still resulted in excessive (about 20%) inclusion of yttrium oxide. It should be noted that the use of the relatively large amount of sodium thiosulfate (about 10 times stoichiometric) generally gives production difficulties as a glass is formed which cements the trays together. With double covering of the trays the inclusion of yttrium oxides is avoided even with considerably lower amounts of sodium thiosulfate. Tests showed that no discernible yttrium oxide was included when the phosphor was fired in double covered trays with five times stoichiometric sodium thiosulfate.

Even with double covered trays, however, it is critical that a minimum of about five times the stoichiometric amount of sodium thiosulfate be used and failure to provide enough sodium thiosulfate again results in the inclusion of yttrium oxide in the phosphor. A series of tests was run in which the amount of sodium thiosulfate was varied and the X-ray intensity for yttrium oxysulfide and yttrium oxide was measured. When the sodium thiosulfate was 2.8 times stoichiometric, the X-ray intensity of the yttrium oxide was almost half the intensity for yttrium oxysulfide. When the sodium thiosulfate was increased to four times stoichiometric the X-ray intensity of the yttrium oxide was more than ⅛ that of the yttrium oxysulfide. When the thiosulfate was raised to 5.2 times stoichiometric, however, the X-ray intensity of the yttrium oxide fell to essentially zero.

Thus, it is clear that it is critical that the firing trays be double covered and it is also critical that the amount of sodium thiosulfate included be at least about five times stoichiometric.

Preferably the fired phosphor is rinsed to remove the residual sodium compounds. Preferably the phosphor is rinsed in hot water followed by a rinse in a slightly acidic aqueous solution (10% Hcl for example) followed by a very dilute (1% $NH_4OH$ for example) basic rinse.

For convenience in production, it is desirable that the amount of sodium thiosulfate be between approximately five and eight times stoichiometric. Less than five times stoichiometric results in the inclusion of yttrium oxide as noted above, and greater than eight times stoichiometric provides difficulties in production as the excess tends to react and produce a glassy material which cements the trays together.

The following specific examples are illustrative of the practice of the instant invention.

Two hundred and sixteen grams of yttrium oxide are mixed with 14.8 grams of yttrium oxide and 395.4 grams of sodium thiosulfate. This raw mix is placed in a tray. A small cover is placed over the raw mix. The first covered tray is then placed inside a second covered tray. The double covered raw mix is then placed in a furnace and fired at about 1300°C for about four hours. After firing, the phosphor is allowed to cool and is then rinsed in water to remove the residual compounds.

The phosphor of the instant invention can also be made by mixing 224.6 grams of yttrium oxide with 13 grams of europium oxide and 475 grams of sodium thiosulfate. This raw mix is then placed in double covered trays as described hereinbefore and the mixture fired at 900° for eight hours.

As is well known in the art, the amount of europium oxide can be varied such that in the $Y_{2-x}O_2S:Eu_x$ phosphor, X can range between the values of about 0.001 to about 0.1. Preferably X is between 0.05 and 0.1. The firing temperature can also be varied between about 900° and 1300°C and the firing time can also be varied between about 4 and 8 hours.

I claim:

1. Method for preparing a europium activated yttrium oxysulfide phosphor of the formula $Y_{2-x}O_2S:Eu_x$, wherein $x$ has a value between about 0.001 and about 0.1 using a raw mix containing all phosphor constituents in solid form and using a single firing in double covered trays, said method comprising:

a. preparing a raw mix containing yttrium oxide and europium oxide in amounts stoichiometric to produce yttrium oxysulfide phosphor and also containing sodium thiosulfate in an amount at least five times the amount stoichiometric for yttrium oxysulfide phosphor; and b. singly firing said raw mix, at a temperature of about 900°–1300°C in double covered trays.

2. The method of claim 1, wherein after said firing, said phosphor is washed to remove residual sodium compounds.

3. The method of claim 1, wherein the amount of sodium thiosulfate is between 5 and 8 times stoichiometric.

* * * * *